United States Patent
Kenworthy et al.

(10) Patent No.: US 6,605,142 B1
(45) Date of Patent: Aug. 12, 2003

(54) CHEMICAL COMPOSITION FOR INK

(75) Inventors: Mark Kenworthy, Blackley (GB); Neil Anthony Tallant, Blackley (GB); Philip Macfaul, Blackley (GB)

(73) Assignee: Avecia Limited, Blackley (GB)

( * ) Notice: Subject to any disclaimer, the term of this patent is extended or adjusted under 35 U.S.C. 154(b) by 0 days.

(21) Appl. No.: 09/856,964

(22) PCT Filed: Nov. 29, 1999

(86) PCT No.: PCT/GB99/03974
§ 371 (c)(1),
(2), (4) Date: May 30, 2001

(87) PCT Pub. No.: WO00/37574
PCT Pub. Date: Jun. 29, 2000

(30) Foreign Application Priority Data

Dec. 21, 1998 (GB) .............................................. 9827895
Jun. 4, 1999 (GB) .............................................. 9913012

(51) Int. Cl.$^7$ .......................... C09D 11/00; C09D 11/02; B05D 1/26; B32B 3/00; B32B 27/14
(52) U.S. Cl. ............................. 106/31.27; 106/31.35; 106/31.6; 106/31.67; 427/466; 428/32.1
(58) Field of Search ........................... 106/31.27, 31.35, 106/31.6, 31.67; 427/466; 428/32.1

(56) References Cited

U.S. PATENT DOCUMENTS

| 4,361,842 A | * 11/1982 | Haruta et al. ................ 347/100 |
| 5,073,448 A | 12/1991 | Vieira et al. ................. 428/331 |
| 5,746,818 A | * 5/1998 | Yatake ..................... 106/31.86 |
| 6,053,969 A | * 4/2000 | Lauw et al. .............. 106/31.27 |
| 6,261,353 B1 | * 7/2001 | Doi et al. .................. 106/31.6 |
| 2002/0069789 A1 | * 6/2002 | Katsuragi et al. ........ 106/31.27 |

FOREIGN PATENT DOCUMENTS

| EP | 0 534 634 | 3/1993 |
| EP | 0 875 544 | 11/1998 |
| WO | WO 98/30642 | 7/1998 |

OTHER PUBLICATIONS

Database WPI Section Ch, Week 199003, Derwent Publications Ltd., London, GB; AN 1990–020134, XP002900886 & JP 01 301359 A (Sanyo Chem Ind Ltd), Dec. 5, 1989 abstract.
Database WPI, Section Ch, Week 198904, Derwent Publications Ltd., London, GB; AN 1989–027441 XP002900887 & JP 63 299970 A 9RICOH KK), Dec. 7, 1988 abstract.
Moura et al, Dyes and Pigments, 33(3):173–196 (1997), no month available.

* cited by examiner

*Primary Examiner*—Helene Klemanski
(74) *Attorney, Agent, or Firm*—Pillsbury Winthrop LLP

(57) ABSTRACT

An ink comprising:
a) an aqueous medium;
b) colorant; and
c) a compound of Formula (1);

$$M[X]_n \qquad (1)$$

wherein:
M is a copper, nickel, cobalt or manganese cation;
X is a carboxylic acid anion comprising at least four carbon atoms; and
n is from 1 to 2 inclusive.

21 Claims, No Drawings

CHEMICAL COMPOSITION FOR INK

This application is the National Phase of International Application PCT/GB99/03974 filed Nov. 29, 1999 which designated the U.S. and that International Application.

This invention relates to aqueous compositions which are particularly suitable for use in ink jet printing (IJP), to substrates carrying such compositions, to cartridges containing the compositions and to ink jet printing methods.

IJP is a non-impact printing technique in which droplets of ink are ejected through a fine nozzle onto a substrate without bringing the nozzle into contact with the substrate. There are many demanding performance requirements for dyes and inks used in IJP. For example they desirably provide sharp, non-feathered images having good water-fastness, light-fastness and optical density. The inks are often required to dry quickly when applied to a substrate to prevent smudging, but they should not form a crust over the tip of an ink jet nozzle because this will stop the printer from working. The inks should also be stable to storage over time without decomposing or forming a precipitate which could block the fine nozzle.

We have found that the incorporation of certain forms of soluble transition metal ions into inks for IJP provides prints which exhibit enhanced light-fastness. We have also found that this effect may be achieved when a composition containing these soluble transition metal ions is added to the substrate separately or is carried by the substrate prior to or after ink jet printing.

According to the present invention there is provided an ink comprising:
a) an aqueous medium;
b) colorant; and
c) a compound of Formula (1);

$$M[X]_n \quad (1)$$

wherein:
M is a copper, nickel, cobalt and manganese cation;
X is a carboxylic acid anion comprising at least four carbon atoms; and
n is from 1 to 2 inclusive.

The cation represented by M may be any one of copper, nickel, cobalt and manganese cations or a mixture of two or more of such cations. Preferably M is copper or nickel. It is especially preferred that M is copper (I) or, more preferably, copper (II).

X is preferably a carboxylic acid anion comprising from 4 to 20, more preferably from 4 to 8 carbon atoms (including the carbon atom in the acid group). The carbon atoms are preferably arranged in a cyclic group or in a straight chain or branched chain.

Preferred cyclic groups are 5- and 6-membered rings, especially homocyclic and heterocyclic rings. Examples of homocyclic rings include phenyl, naphthyl, cyclopentyl and cyclohexyl rings. Examples of heterocyclic rings include thiophene and especially furanyl, dihydrofuranyl, tetrahydrofuranyl, pyranyl, dihydropyranyl and tetrahydropyranyl rings.

The compound of Formula (1) is preferably in the form of a complex between the group(s) represented by X and the cation represented by M. In a preferred embodiement X is a bidentate or higher-dentate ligand for M, especially a bidentate, tridentate, quadridentate, pentadentate or hexadentate ligand for M. Accordingly X preferably carries one or more electron donor groups. These electron donor groups may work in combination with the carboxylic anion (i.e. —COO$^-$) to tightly bind X to M, thereby lowering the likelihood of M leaking into the environment or having any undesirable properties associated with free metal ions.

The compound of Formula (1) may also have other small molecules co-ordinated to the metal cation represented by M, for example H$_2$O molecules commonly co-ordinate with transition metals by means of the lone pair of electrons on their oxygen atom. In this way copper salicylate normally has the formula Cu(salicylate)$_2$.2H$_2$O in which the carboxylate anions bind ionically to the copper cation, the phenolic hydroxy groups act as an electron donor contributing their oxygen electrons to the copper and two water molecules donate their electrons to the copper to give what can be described as a 'bi-pyramidal shell' around a central copper cation. It will be understood that such compounds having small molecules coordinated to the metal cation fall within the scope of the present invention.

The electron donor groups may be any of those commonly used in transition metal complexes, particularly groups containing an oxygen (e.g. hydroxy or ether), sulphur (e.g. thiol or thioether), amino (e.g. primary, secondary, tertiary or —N═N—) or tertiary phosphine atom.

The electron donor groups and the carboxylic anion in X will usually be arranged relative to each other such that the complex formed by X with M is thermally stable, for example they form a 3-, 4-, 5-, 6-, or 7-membered ring or bridge with M, especially a 5- or 6-membered ring or bridge. Preferably X is free from —N═N— groups.

Preferred anions represented by X are heterocyclic carboxylic acid anions comprising at least four carbon atoms, more especially anionic carboxylic acid derivatives of mono-, di- and tri-saccharides, for example, aldonic acids (e.g. 6-phosphogluconic acid) and particularly, glucuronic acid, muramic acid and sialic acid.

The anion represented by X is preferably of the formula RCOO$^-$ wherein R is an optionally substituted organic group comprising at least 3 carbon atoms. Preferably R is an optionally substituted organic group comprising from 3 to 12, more preferably 4 to 8 carbon atoms. The optional substituents are preferably selected from hydroxy, sulpho, carboxy, phosphate, phosphonate, amino (including —N═N—, but more preferably primary, secondary or tertiary amino), amido (especially C$_{1-4}$-alkanoylamino) cyano, alkoxy (especially C$_{1-4}$-alkoxy) and ester (especially —CO$_2$—C$_{1-4}$-alkyl). Equally the optional substituents for R may be thiol, thioalkoxy (especially C$_{1-4}$-alkoxy, optionally carrying a carboxy group) or tertiary phosphine. Preferably the compounds of Formula (1), and the groups represented by R, are free from —N═N— groups.

In one embodiement preferred anions represented by X are carboxylic acid anions comprising 4 to 8 carbon atoms (including the carbon atom in the acid group), optionally substituted by one or more hydroxy groups and/or optionally interrupted by one or more amino, ether, thioether or carbonyl groups, for example; tartaric acid, oxaloacetic acid, malic acid, citric acid. It is especially preferred that X is gluconic acid.

Examples of carboxylic acid anions comprising at least four carbon atoms which may form a complex with M include the following categories:
(i) compounds comprising an aromatic ring carrying a carboxylic acid anion on a first carbon atom of the ring and an electron donor group on a second carbon atom of the ring, wherein the first and second carbon atoms are separated from each other by one covalent bond. Specific examples of such compounds include the anions of 4- or 5-sulpho salicylic acid, 1-hydroxy-2- carboxy-5-sulphonaphthalene, 4- or 5-sulfoanthranilic acid, 4-sulfo-N-phenylanthranailic acid, 4- or 5-hydroxythiosalicylic acid, 4- or 5-sulfothiosalylic acid, 2,4-dicarboxythiophenol, 4-sulfophthalic acid, 1-hydroxy-2,4-dicarboxynaphthalene, 2-amino-3-hydroxybenzoic acid, 2,4,5-trihydroxybenzoic acid, 2,2'-dithiosalicylic acid, 1-thio-2-carboxy-4-sulfonaphthalene and 1-amino-2-carboxy-4-sulfonaphthalene; and (ii) compounds comprising an aliphatic chain of carbon atoms carrying a carboxylic acid anion on a first carbon atom of the chain and an electron donor group on a second carbon atom of the chain, wherein the first and second carbon atoms are the same carbon atom or they are separated from each other by one, two or three covalent bonds. In this embodiment the electron donor group(s) may form part of the chain or be pendant on the chain. Specific examples of such compounds include the anions of ethylenediamine tetraacetic acid ("EDTA") citric acid, tartric acid, L-tyrosine, malic acid, gluconic acid, mucic acid, quinic acid, chelidonic acid, 3,3'-thiodipropionic acid, meso-2,3-dimercaptosuccinic acid, mercaptosuccinic acid, 2-isoporpylmalic acid, nitrilotriacetic acid, 1,6-diaminohexane-N,N,N',N'-tetracacetic acid, diethylenetriaminepentaacetic acid, diethylenetriaminehexaacetic acid, tricine, bicine and lanthionine;

(iii) mixtures comprising two or more of the foregoing.

As will be understood, the pH of the ink will in many cases determine whether the carboxylic acid group is in the form of an anion and the electron donor groups are in the form where they are able to donate electrons rather than act as an anion. For example, the pH of the ink may be selected such that a compound carrying two carboxy groups of differing pKas may have one of those carboxy groups in the form of a carboxylic acid anion and the other carboxy group in un-ionised form acting as an electron donor group. Accordingly the ink preferably has a pH such that the compound of Formula (1) is in the form of a complex between the group(s) represented by X and the cation represented by M.

Preferred groups represented by X are the anions of gluconic acid, EDTA, 4-sulphosalicylic acid and 5-sulphosalicylic acid.

The preferred compounds of Formula (1) are copper gluconate, copper EDTA and copper 4- or 5-sulphosalicylate The colorant is preferably a dye or a mixture of dyes, preferably yellow, magenta, cyan or black. Preferred dyes are azo (preferably monoazo, disazo or trisazo), xanthene, phthalocyanine, triphenodioxazine or triarylmethane dyes. It is especially preferred that the dye(s) are of the azo dyes, more especially azo dyes in the hydrazo tautomeric form.

The aqueous medium preferably comprises a mixture of water and an organic solvent, preferably in a weight ratio of from 99:1 to 1:99, more preferably from 99:1 to 50:50 and especially from 95:5 to 80:20.

Preferably the organic solvent is a water-miscible organic solvent or a mixture of such solvents. Preferred water-miscible organic solvents include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)ethoxy]-ethanol and ethyleneglycol monoallylether; cydic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulphoxides, preferably dimethyl sulphoxide and sulpholane. Preferably the aqueous medium comprises water and 2 or more, especially from 2 to 8, water-miscible organic solvents.

Especially preferred water-miscible organic solvents are cyclic amides, especially 2-pyrrolidone, N-methyl-pyrrolidone and N-ethyl-pyrrolidone; diols, especially 1,5-pentane diol, ethyleneglycol, thiodiglycol, diethyleneglycol and triethyleneglycol; and mono-$C_{1-4}$-alkyl and $C_{1-4}$-alkyl ethers of diols, more preferably mono-$C_{1-4}$-alkyl ethers of diols having 2 to 12 carbon atoms, especially 2-methoxy-2-ethoxy-2-ethoxyethanol.

Examples of further suitable ink media comprising a mixture of water and one or more organic solvents are described in U.S. Pat. No. 4,963,189, U.S. Pat. No. 4,703,113, U.S. Pat. No. 4,626,284, EP 425,150A and U.S. Pat. No. 5,207,824.

The ink may also contain additional components conventionally used in ink jet printing inks, for example viscosity and surface tension modifiers, corrosion inhibitors, biocides, kogation reducing additives, anti-cockle agents to reduce paper curling and surfactants which may be ionic or non-ionic.

We have also found the light fastness of the inks may be still further improved by including a further organic acid in the inks. Accordingly, the inks of the first aspect of the invention preferably contain a further organic acid, preferably carboxylic acid, more preferably aliphatic or aromatic carboxylic acids. Preferably the further organic acid is a different acid to XH.

The further carboxylic acid preferably contains from 1 to 5, more preferably from 1 to 4 carboxy groups. Optionally the carboxylic acid is further substituted by one or more atoms or group(s) other than carboxy.

Preferred aliphatic carboxylic acids contain up to 20, more preferably from 2 to 15 and especially 2 to 10 carbon atoms (including the carbon atom in the acid, i.e. in the $CO_2H$, group). The aliphatic carboxylic acid may be saturated or unsaturated.

Preferred saturated aliphatic acids are alkane derivatives and preferred unsaturated aliphatic acids are alkene and alkyne derivatives. The alkane, alkene and alkyne groups from which the aliphatic acids are derived may be straight chain, branched chain or cyclic and are optionally interrupted by one or more groups or heteroatoms. Preferred interrupting atoms and groups are selected from —O—, —S—, —NR$^1$—, phenyl, piperazine, —C(O)O and —C(O)—; wherein R$^1$ is H, alkyl (preferably $C_{1-4}$-alkyl) or phenyl.

When the carboxylic acid is further substituted by one or more atom or groups other than carboxy, the substituents are preferably selected from —OH, —NH$_2$, —NO$_2$, —SH, SO$_3$H, —PO$_3$H$_2$, halo (preferably —F or —Cl), $C_{1-4}$-alkyl, $C_{1-4}$-hydroxyalkyl, $C_{1-4}$-alkoxy and $C_{1-4}$-hydroxyalkoxy. It is especially preferred that the carboxylic acid is further substituted by one or more —OH groups.

Preferred saturated aliphatic acids which contain 1 carboxy group include, for example, acetic acid, phosphonoacetic acid, propionic acid, butyric acid, isobutyric acid, valeric acid, dodecanoic acid and cyclohexanecarboxylic acid.

Preferred saturated aliphatic acids which contain more than 1 carboxy group include, for example, oxalic acid, malonic acid, succinic acid, glutaric acid, adipic acid, pimelic acid azelaic acid, 1,2,3,4-butanetetracarboxylic acid, ethylenediamine tetraacetic acid, diglycolic acid, iminodiacetic acid 1,1-cyclohexane diacetic acid and nitriliotriacetic acid.

Preferred unsaturated aliphatic acids include, for example, maleic acid, fumaric acid, citraconic acid and mesaconic acid.

Preferred aliphatic acids which carry one or more —OH groups include, for example, glycolic acid, lactic acid, tartronic acid, malic acid, citric acid, tartaric acid, ascorbic acid, mucic acid and gluconic acid.

When the further organic acid is an aromatic carboxylic acid it is preferably a monocyclic or polycyclic aromatic or heteroaromatic group which is substituted by one or more carboxy group or a group which carries a carboxy group.

Preferred monocyclic aromatic groups include optionally substituted benzene, pyridine, pyridone, thiophene and furan groups.

Preferred polycyclic aromatic groups include a polycyclic aromatic group wherein the cyclic rings are fused together or linked by a single covalent bond or a linker group. Preferred linker groups include —O—, —S—, —NR$^a$— wherein R$^a$ is H or $C_{1-4}$-alkyl, —C(O)—, alkylene and alkenylene groups.

Preferred polycyclic aromatic groups wherein the cyclic rings are fused together include optionally substituted naphthalene, quinoline, indoline and benzofuran.

Preferred polycyclic aromatic groups wherein the cyclic rings are linked by a single covalent bond or a linker group include biphenyl, stillbene and diphenylmethane.

When the aromatic group is further substituted by an atom or group other than carboxy or a group which carries a carboxy group, the preferred substituents are selected from halogen (especially F or Cl); —NO$_2$; —CF$_3$; —CN; —SO$_3$H, —PO$_3$H$_2$; or a $C_{1-6}$alkyl, $C_{2-6}$-alkenyl, $C_{5-8}$-cycloalkyl or $C_{1-6}$-alkoxy group optionally substituted by —OH, —NH$_2$, —NO$_2$, —SO$_3$H, —PO$_3$H$_2$ or halogen; a group of the formula —SR$^2$, or —COOR$^2$ wherein R$^2$ is H, $C_{1-4}$-alkyl, $C_{5-8}$-cycloalkyl or phenyl; and groups of the formula —OR$^3$, —COR$^3$; —NR$^3$R$^4$, —SO$_2$NR$^3$R$^4$, —SOR$^3$, —SO$_2$R$^3$, —NR$^3$COR$^4$, —CONR$^3$R$^4$, or —OCOR$^3$, wherein R$^3$ and R$^4$ each independently is H, $C_{1-4}$-alkyl, $C_{5-8}$-cycloalkyl, phenyl or R$^3$ and R$^4$ together with the nitrogen to which they are attached form a 5 or 6 membered ring, for example piperazine or morpholine.

Other preferred further carboxylic acids are derivatives of mono-, di- and tri-saccharides, for example, aldonic acids (e.g. 6-phosphogluconic acid) and particularly, glucuronic acid, muramic acid and sialic acid.

Examples of preferred aromatic acids which carry one or more carboxy group and one or more —OH group include, for example, sulphosalicylic acid and sulphophthalic acid.

Preferably the ink is yellow, magenta, cyan or black.

The ink preferably comprises:

(a) from 70 to 99.8 parts of an aqueous medium;

(b) from 0.01 to 30, more preferably 1 to 10 parts in total of colorant;

(c) from 0.01 to 30, more preferably 1 to 10 parts in total of the compound of Formula (1); and (d) from 0 to 30, more preferably 0.01 to 10, parts in total of a further organic acid: wherein all parts are by weight and the number of parts of (a)+(b)+(c)+(d)=100.

The inks according to the first aspect of the present invention have improved light fastness compared to when the compound of Formula (1) is omitted. The presence of the further organic acid improves this still further. Surprisingly these improvements can usually be achieved without adversely affecting the other, highly demanding performance requirements for ink jet printing inks such as wet-fastness, brightness, durability, storage stability and reliability.

We have found that the light-fastness of prints may also be improved by incorporating the compound of Formula (1) on or in the substrate which is to be printed. This approach avoids having to reformulate existing stocks of ink and avoids any possibility of the additive causing undesirable operability difficulties in some of the more temperamental types of ink jet printer head.

According to a third aspect of the present invention there is provided a substrate which is coated or impregnated with a compound of Formula (1), as hereinbefore defined. Preferred compounds of Formula (1) are as discussed above in relation to the first aspect of the present invention, especially copper gluconate.

Preferably the substrate is impregnated or coated with a composition comprising a compound of Formula (1) and a liquid medium and optionally a binder.

The liquid medium preferably comprises water or a mixture comprising water and an organic solvent.

The substrate is preferably a paper, plastics material, textile, metal or glass, more preferably a paper, an overhead projector slide or a textile material, especially paper A preferred composition suitable for coating or impregnating the substrate comprises:

(a) from 0.01 to 30, more preferably 1 to 10, parts of a compound of Formula (1);

(b) from 0.01 to 30, more preferably 1 to 10, parts of a binder;

(c) from 0.01 to 99.97, more preferably 0.1 to 50, parts of a water-miscible organic solvent;

(d) from 0.01 to 99.97, more preferably 0.1 to 50 g parts water;

(e) from 0 to 30, more preferably from 0.1 to 10, parts of a further organic acid; wherein all parts are by weight and the total number of parts (a)+(b)+(c)+(d)+(e)=100.

The composition suitable for coating or impregnating the substrate is preferably colourless, weakly coloured or white.

The binder is preferably a polymeric or polymerisable binder, more preferably a water-soluble or water-dissipatable polymeric or polymerisable binder. The substrate preferably carries porous inorganic particles, e.g. alumina (especially boehemite) or siliceous particles, especially particulate amorphous precipitated silica having a calculated multimodal particle size distribution wherein the particle sizes at the modes are less than 10 micrometers, as described in U.S. Pat. No. 5,804,293, and the siliceous particles referred to in PCT/US96/19361, page 9, lines 21 to 29 which are incorporated herein by reference thereto. These particles improve absorbency of the substrate for inks, resulting in better wet and rub fastness properties for the substrate. Optionally the porous inorganic particles are incorporated into the substrate as a component of the binder.

Preferred water-soluble binders include starches, preferably hydroxy alkyl starches, for example hydroxyethylstarch; celluloses, for example cellulose, methylcellulose, hydroxyethylcellulose, hydroxypropylcellulose, hydroxyethyl methyl cellulose and carboxymethlycellulose (and salts thereof) and cellulose acetate butyrate; gelatin; gums, for example guar, xanthan gum and gum arabic; polyvinylalcohol; polyvinylphosphate; polyvinylpyrrolidone; polyvinylpyrrolidine; polyethylene glycol; hydrolysed polyvinylacetate; polyethylene imine; polyacrylamides, for example polyacrylamide and poly(N,N-dimethyl acrylamide); acrylamide-acrylic acid copolymers; polyvinylpyridine; polyvinylphosphate; vinylpyrrolidone-vinyl acetate copolymers; vinyl pyrrolidone-styrene copolymers; polyvinylamine; poly(vinyl pyrrolidonedialkylaminoalkyl alkylacrylates), for example poly vinylpyrrolidone-diethylaminomethylmethacrylate; acid-functional acrylic polymers and copolymers, for example poly(meth)acrylic acid and copolymers of (meth)acrylic acid and other (meth) acrylate monomers; amine-functional acrylic polymers and copolymers, for example polydimethylaminoethylmethacrylate; acid or amine functional urethane polymers, preferably those containing dimethylolpropanoic acid and/or pendant or terminal polyethylene glycols; ionic polymers, especially cationic polymers, for example poly (N,N-dimethyl-3,5-dimethylene piperidinium chloride); polyesters, preferably those which carry water-solubilising groups, especially acid groups, for example polyesters obtainable by polymerising a polyol with sodiosulphoisophthalic acid.

Preferred water-dissipatable binders are water-dissipatable polymers, more preferably latex polymers, for example cationic, non-ionic and anionic styrene-butadiene latexes; vinyl acetate-acrylic copolymer latexes; acrylic copolymer latexes which carry quaternary ammonium groups, for example a polymethylacrylate trimethylammonium chloride latex; and dispersions of poly(acrylate), poly (methacrylate), polyester, polyurethane or vinyl polymers and copolymers thereof. The polymer dispersions are preferably prepared by emulsion, suspension, bulk or solution polymerisation followed by dispersion into water.

The binder may comprise a single binder or comprise a mixture of two or more binders, especially the preferred binders described above. The binder may also be a Quikote™ coating material available from PPG Industries Inc. Colour bleed in the resultant substrate can be reduced or even eliminated if the binder contains (1) water-soluble film-forming organic polymer which is substantially free of onium groups, and (2) a water-soluble or water-dispersible onium addition polymer consisting essentially of onium-containing mer units. Preferably the weight ratio of the binder to the compound of Formula (1) is from 99:1 to 1:99, more preferably from 80:20 to 20:80.

The preferred water-miscible organic solvents are as described above in relation to the inks of the first aspect of the present invention.

The compound of Formula (1) and binder are preferably dispersed or more preferably dissolved in the liquid medium.

Preferred methods for coating or impregnating the substrate with the compound of Formula (1) include, for example, dip coating, reverse roller coating, K-bar coating, spraying and ink jet printing.

When the substrate is coated or impregnated with the compound of Formula (1) in the form of a mixture with a liquid medium prior to ink jet printing with an ink it is preferred that the coated or impregnated substrate is dried before the ink is applied. Any suitable drying method may be used, for example hot air drying.

According to a fourth aspect of the present invention there is provided a process for printing an image on a substrate comprising applying thereto an ink containing a colorant by means of an ink jet printer such that the colorant, when situated on the substrate, is in contact with a compound of Formula (1) as hereinbefore defined.

There are many ways for ensuring that the colorant, when situated on the substrate, is in contact with the compound of Formula (1). For example, the process of this fourth aspect of the invention may use an ink as defined in the first aspect of the present invention. In this way one ensures the colorant and the compound of Formula (1) are both present in the ink and remain together when they have been printed on the substrate. In an ink jet printer containing several different inks, for example a full colour printer having yellow, magenta, cyan and black inks, one may include the compound of Formula (1) in one or more than one of the inks. Any inks which do not contain the compound of Formula (1) may still come into contact with it by virtue of the overlap between inks on the substrate which usually occurs to give full colour prints.

Another way is to perform the process of this fourth aspect of the invention on a substrate as defined in the third aspect of the present invention. In this way the colorant is in contact with the compound of Formula (1) present in the coated or impregnated substrate. Furthermore, there is no need to re-formulate current stocks of inks or risk blockage problems in temperamental ink jet printer heads.

A third way is to apply a composition, preferably a colourless or weakly coloured composition, comprising the compound of Formula (1) and a liquid medium to the area of the substrate which carries the image or will carry the image, by means of an ink jet printer, before, during or after printing the image. The liquid medium is preferably as described above in relation to the ink, except that it contains no colorant. The particular liquid medium used in the ink and in the colourless or weakly coloured composition comprising the compound of Formula (1) may be different or the same.

The above ways for ensuring that the colorant, when situated on the substrate, is in contact with a compound of Formula (1), may be used alone, in a combination of any two ways, or in fact all three together.

In this fourth aspect of the invention, the ink jet printer preferably applies the ink or the colourless composition to the substrate in the form of droplets which are ejected through a small orifice onto the substrate. Preferred ink jet printers are piezoelectric ink jet printers and thermal ink jet printers. In thermal ink jet printers, programmed pulses of heat are applied to the ink or colourless composition in a reservoir by means of a resistor adjacent to the orifice, thereby causing the ink or the colourless composition to be ejected in the form of small droplets directed towards the substrate during relative movement between the substrate and the orifice. In piezoelectric ink jet printers the oscillaton of a small crystal causes ejection of the ink or the colourless composition from the orifice.

The substrate is preferably a paper, plastic, textile, metal or glass, more preferably a paper, an overhead projector slide or a textile material, especially paper.

Preferred papers are plain or treated papers which may have an acid, alkaline or neutral character. Examples of commercially available treated papers include HP Premium Coated Paper (available from Hewlett Packard Inc.), HP Photopaper (available from Hewlett Packard Inc.), Stylus Pro 720 dpi Coated Paper, Epson Photo Quality Glossy Film (available from Seiko Epson Corp.), Epson Photo Quality Glossy Paper (available from Seiko Epson Corp.), Canon HR 101 High Resolution Paper (available from Canon), Canon GP 201 Glossy Paper (available from Canon), and Canon HG 101 High Gloss Film (available from Canon). These papers may easily be modified to include a compound of Formula (1) during their manufacture. For example, one may perform the process described in PPG's U.S. Pat. No. 5,880,196, Example 1, or U.S. Pat. No. 5,804,293, Examples 1 to 110, or in the Examples of U.S. Pat. No. 4,892,779, modified such that a compound of Formula (1) is included as an ingredient in the coating compositions described in these Examples.

When the substrate is a textile material the ink or the solution is preferably applied to the textile material by an ink jet printer followed by heating the printed textile material at a temperature of from 50° C. to 250° C.

Preferred textile materials are natural, synthetic and semi-synthetic materials. Examples of preferred natural textile materials include wool, silk, hair and cellulosic materials, particularly cotton, jute, hemp, flax and linen. Examples of preferred synthetic and semi-synthetic materials include polyamides, polyesters, polyacrylonitriles and polyurethanes.

The composition referred to in the fourth aspect of the present invention is preferably colourless. In this case, the ink and the colourless solution are preferably applied to the substrate through different nozzles. For example, in the case of a full colour ink jet printer, the coloured inks, which may or may not contain a compound of Formula (1), are applied to the substrate by means of an ink jet printer through different nozzles than the weakly coloured or colourless composition containing the compound of Formula (1). A suitable ink jet printer and a method for its control is described in EP 657 849.

According to a fifth aspect of the present invention there is provided an ink jet printer cartridge containing an ink as defined in the first or second aspect of the invention or a composition, preferably a colourless or weakly coloured composition, comprising a liquid medium and the compound of Formula (1) (preferably as defined above in relation to the composition for coating or impregnating a substrate).

The invention is further illustrated by the following Examples in which all parts are by weight.

EXAMPLE 1

Ink's were prepared having the following compositions.
Ink 1
 4 parts of copper gluconate
 3.5 parts of Procion® Red PX-6B
 5 parts of 2-pyrolidone
 5 parts of thiodiglycol
 2 parts of Surfynol 465 (a non-ionic surfactant) sufficient sodium hydroxide to adjust the pH to 5 make up to 100 parts with water
Comparative Ink A
 An ink identical to Ink 1 was prepared except that 4 parts of water was used in place of the 4 parts of copper gluconate.
Ink 2
 4 parts of copper gluconate
 3.5 parts of C.I. Acid Red 289
 5 parts of 2-pyrolidone
 5 parts of thiodiglycol
 2 parts of Surfynol 465 (a non-ionic surfactant) sufficient sodium hydroxide to adjust the pH to 5 and make up to 100 parts with water Comparative Ink B
 An ink identical to Ink 2 was prepared except that 4 parts of water was used in place of the 4 parts of copper gluconate.

Light Fastness Measurements

The inks were printed onto the substrates using a SEC Stylus Pro Printer.

After drying, the prints were mounted, half covered, in an Atlas Ci35a weatherometer and irradiated for 64 hours. The prints were removed and the reflected optical density of the exposed and covered portions were measured using an X-Rite™938 densitometer. These readings were used to calculate the percentage optical density loss following the irradiation.

The results obtained with the inks on Gilbert Bond Paper and Premium Glossy Paper are shown in Tables 1 and 2 respectively.

TABLE 1

Light-fastness on Gilbert Bond Paper

| Ink | Additive | Percentage OD loss |
| --- | --- | --- |
| Comparative Ink A | None | 29% |
| Ink 1 | copper gluconate | 14% |
| Comparative Ink B | None | 38% |
| Ink 2 | copper gluconate | 16% |

TABLE 2

Light-fastness on Premium Glossy Paper

| Ink | Additive | Percentage OD loss |
| --- | --- | --- |
| Comparative Ink A | None | 67% |
| Ink 1 | copper gluconate | 49% |
| Comparative Ink B | None | 32% |
| Ink 2 | copper gluconate | 6% |

OD = optical density

EXAMPLE 2

Inks 3 and 4

Inks 3 and 4 were prepared with identical formulations to those described in Example 1, Inks 1 and 2, except that in place of 4 parts of copper gluconate there was used 4 parts of copper (II) ethylenediamine tetraacetic acid ("CuEDTA")

EXAMPLE 3

Ink 5

Pro-Jet Fast Magenta 2 (0.3 g) was dissolved in water (8.25 g) by adjusting the pH to 8.5 using NaOH. 2-Pyrrolidone (0.75 g), propane-1,3-diol (0.5 g), Surfynol 465 (0.2 g) and cobalt (4-sulphosalicylate)$_2$.2H$_2$O complex ("CoSal", 0.2 g) were added and the ink stirred at room temperature, then placed in the cartridge of a HP560 ink jet printer and printed onto paper.

When the resultant print had dried, it was mounted, half covered, in an Atlas Ci35a Weatherometer and irradiated for 48 hours. The print was removed and the difference in colour intensity (ΔE) between the irradiated and covered portions of the print were measured on an X-Rite spectrodensitometer.

Ink 6

An ink was prepared exactly as described for Ink 5 except that in place of cobalt (4-sulphosalicylate)$_2$ complex (0.2 g) there was used nickel (II) (4-sulphosalicylate)$_2$.2H$_2$O complex ("NiSal", 0.2 g).

Comparative Ink C

An ink was prepared exactly as described for Ink 5 except that CoSal was omitted.

The results in ΔE for Inks 5, 6 and E are shown in Table 3 below. A low figure for ΔE indicates low fading, i.e. high light-fastness.

TABLE 3

| Ink | Additive | ΔE @ 48 hours |
| --- | --- | --- |
| Ink 5 | CoSal | 6.1 |
| Ink 6 | NiSal | 4.5 |
| Comparative Ink C | None | 15.8 |

EXAMPLE 4

A coating composition may be prepared by the method described in U.S. Pat. No. 5,880,196, column 12, line 39 to column 14, line 25, which is incorporated herein by reference thereto. To this composition the following additives indicated in Table 4 below may be added in the wt % shown in the second column.

TABLE 4

| Additive | wt % |
| --- | --- |
| Copper gluconate | 0.5 |
| Copper gluconate | 1.5 |
| CoSal | 0.8 |
| CoSal | 1.3 |
| NiSal | 0.4 |
| NiSal | 1.6 |

Each of the coating compositions described in Table 4 above may be applied to poly(ethylene terphthalate) substrate and printed by the method described in U.S. Pat. No. 5,880,196, column 14, lines 26 to 33, which are incorporated herein by reference thereto.

EXAMPLE 5

Ink's were prepared having the following compositions.
Ink 7
  2 parts copper EDTA
  2.5 parts Pro-Jet® Fast Black 2
  2.5 parts Pro-Jet® Black OAM
  9 parts 2-pyrolidone
  9 parts thiodiglycol
  2 parts cyclohexanol sufficient lithium hydroxide to adjust the pH to 9 made up to 100 parts with water
Comparative Ink D An ink identical to Ink 7 was prepared except that 2 parts of water was used in place of the 2 parts copper EDTA. The inks were printed onto the substrates using a Canon 4300 printer and when the resultant print had dried, it was mounted, half covered, in an Atlas Ci35a weatherometer and irradiated for 100 hours. The print was removed and the difference in colour intensity (ΔE) between the irradiated and the covered portions of the print were measured on an X-Rite spectrodensitometer.

TABLE 5

Light-fastness on Xerox acid paper

| Ink | Additive | ΔE |
| --- | --- | --- |
| Ink 7 | Copper EDTA | 2.2 |
| Comparative Ink D | None | 16.5 |

TABLE 6

Light-fastness on Champion register bond

| Ink | Additive | ΔE |
| --- | --- | --- |
| Ink 7 | Copper EDTA | 4.8 |
| Comparative Ink D | None | 10.3 |

What is claimed is:

1. An ink comprising:
   a) an aqueous medium;
   b) colorant; and
   c) a compound of Formula (1);

$$M\{X\}_n \qquad (1)$$

wherein:
   M is a copper, nickel or manganese cation;
   X is a carboxylic acid anion comprising at least four carbon atoms; and
   n is from 1 to 2 inclusive.

2. An ink comprising:
   a) an aqueous medium;
   b) colorant; and
   c) a compound of formula (1):

$$M\{X\}_n \qquad (1)$$

wherein:
   M is copper, nickel, cobalt or manganese cation;
   X is a carboxylic acid anion comprising at least four carbon atoms; and
   n is from 1 to 2, inclusive, and
   d) a further organic acid.

3. An ink according to claim 1 or claim 2 wherein the compound of Formula (1) is in the form of a complex between the group(s) represented by X and the cation represented by M.

4. An ink according to any one of claims 1 or 2 wherein X is a bidentate or higher-dentate ligand for M.

5. An ink according to any one of claims 1 or 2 wherein X is an anion of gluconic acid, 4- or 5-sulphosalicylic acid, 1-hydroxy-2-carboxy-5-sulphonaphthalene, 4- or 5-sulfoanthranilic acid, 4-sulfo-N-phenylanthranailic acid, 4- or 5-hydroxythiosalicylic acid, 4- or 5-sulfothiosalicylic acid, 2,4-dicarboxythiophenol, 4-sulfophthalic acid, 1-hydroxy-2,4-dicarboxynaphthalene, 2-amino 3-hydroxybenzoic acid, 2,4,5-trihydroxybenzoic acid, 2,2'-dithiosalicylic acid, 1-thio-2-carboxy-4-sulfonaphthalene and 1-amino-2-carboxy-4-sulfonaphthalene, ethylenediamine tetraacetic acid, citric acid, tartaric acid, L-tyrosine, malic acid, mucic acid, quinic acid, chelidonic acid, 3,3'-thiodipropionic acid, meso-2,3-dimercaptosuccinic acid, mercaptosuccinic acid, 2-isopropylmalic acid, nitrilotriacetic acid, 1,6-diaminohexane-N,N,N',N'-tetracacetic acid, diethylenetriaminepentaacetic acid, diethylenetriaminehexaacetic acid, tricine, bicine or lanthionine or a mixture comprising two or more thereof.

6. An ink according to claim 1 or 2 wherein the compound of Formula (1) is copper gluconate.

7. An ink according to any one of claims 1 or 2 wherein the colorant is a dye or a mixture of dyes.

8. An ink according to any one of 1 or 2 which comprises:
   (a) from 70 to 99.8 parts of an aqueous medium;
   (b) from 0.01 to 30 parts in total of colorant;

(c) from 0.01 to 30 parts in total of the compound of Formula (1); and (d) from 0 to 30 parts in total of a further organic acid; wherein all parts are by weight and the number of parts of (a)+(b)+(c)+(d)=100.

9. A substrate coated or impregnated with a compound of Formula (1)

$$M\{X\}_n \qquad (1)$$

wherein:

M is copper, nickel or manganese cation;

X is a carboxylic acid anion comprising at least four carbon atoms; and n is from 1 to 2, inclusive.

10. A substrate according to claim 9 which is coated or impregnated with a composition comprising a compound of Formula (1), a liquid medium and optionally a binder.

11. A substrate according to claim 10 wherein the binder is a water-soluble or water-dissipatable polymeric or polymerisable binder, optionally containing porous inorganic particles.

12. A substrate according to any one of claims 9 to 11 wherein the substrate is a paper, overhead projector slide or textile material.

13. A process for printing an image on a substrate comprising applying thereto an ink containing a colorant by means of an ink jet printer such that the colorant, when situated on the substrate, is in contact with a compound of Formula (1)

$$M\{X\}_n \qquad (1)$$

wherein:

M is copper, nickel or manganese cation;

X is a carboxylic acid anion comprising at least four carbon atoms; and n is from 1 to 2, inclusive.

14. A process according to claim 13 wherein the ink containing a colorant is an ink as defined in claim 1.

15. A process according to claim 13 or 14 wherein the substrate is coated or impregnated with a compound of Formula (1).

16. A process according to any one of claims 13 or 14 wherein a composition comprising a compound of Formula (1) and a liquid medium is applied to the area of the substrate which carries the image or will carry the image, by means of an ink jet printer, before, during or after printing the image.

17. A composition comprising:

(a) from 0.01 to 30 parts of a compound of Formula (1)

$$M\{X\}_n \qquad (1)$$

wherein:

M is copper, nickel or manganese cation;

X is a carboxylic acid anion comprising at least four carbon atoms; and n is from 1 to 2, inclusive;

(b) from 0.01 to 30 parts of a binder;

(c) from 0.01 to 99.97 parts of a water-soluble organic solvent;

(d) from 0.01 to 99.97 parts water; and (e) from 0 to 30 parts of a further organic acid; wherein all parts are by weight and the total number of parts (a)+(b)+(c)+(d)+(e)=100.

18. An ink jet printer cartridge containing an ink according to any one of claims 1 or 2.

19. A composition comprising:

(a) from 0.01 to 30 parts of a compound of Formula (1)

$$M\{X\}_n \qquad (1)$$

wherein:

M is copper, nickel, cobalt or manganese cation;

X is a carboxylic acid anion comprising at least four carbon atoms; and n is from 1 to 2, inclusive;

(b) from 0.01 to 30 parts of a binder;

(c) from 0.01 to 99.97 parts of a water-soluble organic solvent;

(d) from 0.01 to 99.97 parts water; and (e) from 0.1 to 30 parts of a further organic acid; wherein all parts are by weight and the total number of parts (a)+(b)+(c)+(d)+(e)=100.

20. An ink according to claim 2, wherein the further organic acid d) comprises a carboxylic acid having from 1 to 4 carboxy groups and from 2 to 20 carbon atoms and is an acid different than the acid XH, where X is defined above in connection with Formula (1).

21. An ink according to claim 2, wherein the further organic acid d) is a saturated or unsaturated aliphatic carboxylic acid.

* * * * *